(12) United States Patent
Soh et al.

(10) Patent No.: US 9,031,098 B1
(45) Date of Patent: May 12, 2015

(54) ALL FIBER PASSIVELY Q-SWITCHED LASER

(75) Inventors: Daniel B. S. Soh, Pleasanton, CA (US); Scott E. Bisson, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 175 days.

(21) Appl. No.: 13/551,762

(22) Filed: Jul. 18, 2012

Related U.S. Application Data

(60) Provisional application No. 61/576,210, filed on Dec. 15, 2011.

(51) Int. Cl.
| | |
|---|---|
| H01S 3/067 | (2006.01) |
| H01S 3/16 | (2006.01) |
| H01S 3/113 | (2006.01) |
| H01S 3/094 | (2006.01) |

(52) U.S. Cl.
CPC .............. *H01S 3/067* (2013.01); *H01S 3/06708* (2013.01); *H01S 3/1618* (2013.01); *H01S 3/1608* (2013.01); *H01S 3/113* (2013.01); *H01S 3/094042* (2013.01)

(58) Field of Classification Search
CPC . H01S 3/06708; H01S 3/06745; H01S 3/067; H01S 3/113
USPC ............................................................. 372/6
See application file for complete search history.

(56) References Cited

U.S. PATENT DOCUMENTS

| | | | |
|---|---|---|---|
| 6,137,813 A * | 10/2000 | Ionov et al. ..................... 372/6 |
| 6,324,326 B1 * | 11/2001 | Dejneka et al. ................ 385/123 |
| 6,335,822 B1 * | 1/2002 | Toyohara .................... 359/341.1 |
| 7,412,135 B2 * | 8/2008 | Seifert et al. ..................... 385/39 |
| 2005/0033388 A1 * | 2/2005 | Brugger et al. .................. 607/89 |
| 2005/0207454 A1 * | 9/2005 | Starodoumov et al. ........... 372/4 |
| 2007/0211774 A1 * | 9/2007 | Ebbers et al. .................... 372/22 |
| 2007/0230884 A1 * | 10/2007 | Minelly et al. ................ 385/125 |
| 2009/0080835 A1 * | 3/2009 | Frith ............................... 385/50 |
| 2010/0296527 A1 * | 11/2010 | Nicholson ......................... 372/6 |
| 2012/0069859 A1 * | 3/2012 | Lin et al. ........................... 372/6 |
| 2012/0147909 A1 * | 6/2012 | Tsai et al. .......................... 372/6 |

OTHER PUBLICATIONS

Soh, Daniel B. et al., "High-power all-fiber passively Q-switched laser using a doped fiber as a saturable absorber: numerical simulations", Optics Letters, vol. 36, No. 13, Jul. 1, 2011, pp. 2536-2538.

* cited by examiner

*Primary Examiner* — Yuanda Zhang
*Assistant Examiner* — Michael Carter
(74) *Attorney, Agent, or Firm* — Marcus S. Simon

(57) ABSTRACT

Embodiments relate to an all fiber passively Q-switched laser. The laser includes a large core doped gain fiber having a first end. The large core doped gain fiber has a first core diameter. The laser includes a doped single mode fiber (saturable absorber) having a second core diameter that is smaller than the first core diameter. The laser includes a mode transformer positioned between a second end of the large core doped gain fiber and a first end of the single mode fiber. The mode transformer has a core diameter that transitions from the first core diameter to the second core diameter and filters out light modes not supported by the doped single mode fiber. The laser includes a laser cavity formed between a first reflector positioned adjacent the large core doped gain fiber and a second reflector positioned adjacent the doped single mode fiber.

20 Claims, 4 Drawing Sheets

ALL FIBER PASSIVELY Q-SWITCHED LASER

CROSS-REFERENCE TO RELATED APPLICATIONS

This application claims priority under 35 U.S.C. §119(e)(1) of provisional application Ser. No. 61/576,210 filed Dec. 15, 2011 and incorporated herein by reference.

STATEMENT REGARDING GOVERNMENT RESEARCH AND DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

Q-switching is achieved by putting some type of variable attenuator inside a laser's optical resonator. When the attenuator is functioning, light which leaves the gain medium does not return, and lasing cannot begin. The variable attenuator is commonly called a "Q-switch", when used for this purpose.

Initially the laser medium is pumped while the Q-switch is set to prevent feedback of light into the gain medium (producing an optical resonator with low Q). This produces a population inversion, but laser operation cannot yet occur since there is no feedback from the resonator. Since the rate of stimulated emission is dependent on the amount of light entering the medium, the amount of energy stored in the gain medium increases as the medium is pumped. Due to losses from spontaneous emission and other processes, after a certain time the stored energy will reach some maximum level; the medium is said to be gain saturated. At this point, the Q-switch device is quickly changed from low to high Q, allowing feedback and the process of optical amplification by stimulated emission to begin. Because of the large amount of energy already stored in the gain medium, the intensity of light in the laser resonator builds up very quickly; this also causes the energy stored in the medium to be depleted almost as quickly. The net result is a short pulse of light output from the laser, known as a giant pulse, which may have a very high peak intensity.

Active Q-Switching

Here, the Q-switch is an externally-controlled variable attenuator. This may be a mechanical device such as a shutter, chopper wheel, or spinning mirror/prism placed inside the cavity, or (more commonly) it may be some form of modulator such as an acousto-optic device or an electro-optic device—a Pockels cell or Kerr cell. The reduction of losses (increase of Q) is triggered by an external event, typically an electrical signal. The pulse repetition rate can therefore be externally controlled.

Modulators generally allow a faster transition from low to high Q, and provide better control. An additional advantage of modulators is that the rejected light may be coupled out of the cavity and can be used for something else. Alternatively, when the modulator is in its low-Q state, an externally-generated beam can be coupled into the cavity through the modulator. This can be used to "seed" the cavity with a beam that has desired characteristics (such as transverse mode or wavelength). When the Q is raised, lasing builds up from the initial seed, producing a Q-switched pulse that has characteristics inherited from the seed.

Passive Q-Switching

In this case, the Q-switch is a saturable absorber, a material whose transmission increases when the intensity of light exceeds some threshold. The material may be an ion-doped crystal like Cr:YAG, which is used for Q-switching of Nd:YAG lasers, a bleachable dye, or a passive semiconductor device. Initially, the loss of the absorber is high, but still low enough to permit some lasing once a large amount of energy is stored in the gain medium. As the laser power increases, it saturates the absorber, i.e., rapidly reduces the resonator loss, so that the power can increase even faster. Ideally, this brings the absorber into a state with low losses to allow efficient extraction of the stored energy by the laser pulse. After the pulse, the absorber recovers to its high-loss state before the gain recovers, so that the next pulse is delayed until the energy in the gain medium is fully replenished.

SUMMARY

Embodiments of the invention relate to an all fiber passively Q-switched laser. In an embodiment, the all fiber passively Q-switched laser includes a large core gain fiber, which supports possibly multiple transversal modes, having a first end and a second end opposite the first end. The large core gain fiber has a first core diameter. The all fiber passively Q-switched laser further includes a doped single mode fiber having a second core diameter that is smaller than the first core diameter. The doped single mode fiber is configured as a saturable absorber and has a first end and a second end opposite the first end. The all fiber passively Q-switched laser further includes a mode transformer, positioned between the second end of the large core doped gain fiber and the first end of the doped single mode fiber. The mode transformer transforms the transversal mode from the large core fiber to that of the small single-mode fiber. One form of the mode transformer is tapered fiber, which has a core diameter that transitions from the first core diameter to the second core diameter. If the large core fiber supports multiple modes, only the fundamental mode can be coupled into the small single-mode fiber through the mode transformer, while all the other higher-order modes are filtered out. The all fiber passively Q-switched laser also includes a laser cavity formed between a first reflector positioned adjacent the large core doped gain fiber and a second reflector positioned adjacent the single mode fiber. An output light beam of the all fiber passively Q-switched laser passes through the first reflector.

Other embodiments disclosed herein relate to methods of generating laser light using an all fiber passively Q-switched laser. In an embodiment, the method includes receiving pump energy at a large core doped gain fiber of the all fiber passively Q-switched laser. The pump energy excites ions in the large core doped gain fiber such that light energy possibly having a plurality of light modes is generated. The method also includes filtering at least some of the generated light energy at a mode transformer. The mode transformer has a core diameter that transitions from a core diameter of the large core doped gain fiber to a core diameter of a single mode fiber of the all fiber passively Q-switched laser. The transition causes the mode transformer to filter out light modes not supported by the single mode fiber. The method further includes receiving the light energy from the mode transformer at the doped single mode fiber. The doped single mode absorbs the light energy until a saturation threshold level is reached. In response to reaching the saturation threshold level, the method includes bleaching the doped single mode fiber to transmit the light energy with a negligible loss. The transmitted light is reflected from one end of laser cavity at the single-mode fiber side. The reflected light re-enters the bleached saturable absorber fiber, which transmits the reflected light with a negligible loss. The method also includes receiving the reflected light energy at the large core doped gain fiber to cause the large core doped gain fiber to generate a short pulse, high energy beam of light as an output of the all fiber passively Q-switched laser.

These and other advantages and features of the present disclosure will become more fully apparent from the following description and appended claims, or may be learned by the practice of the embodiments as set forth hereinafter.

BRIEF DESCRIPTION OF THE DRAWINGS

To further clarify the advantages and features of the various embodiments of the invention, a more particular description will be rendered by reference to specific embodiments that are illustrated in the appended drawings. It is appreciated that these drawings depict only typical embodiments of the invention and are therefore not to be considered limiting of its scope. The various embodiments will be described and explained with additional specificity and detail through the use of the accompanying drawings in which.

DETAILED DESCRIPTION

Figure 1:
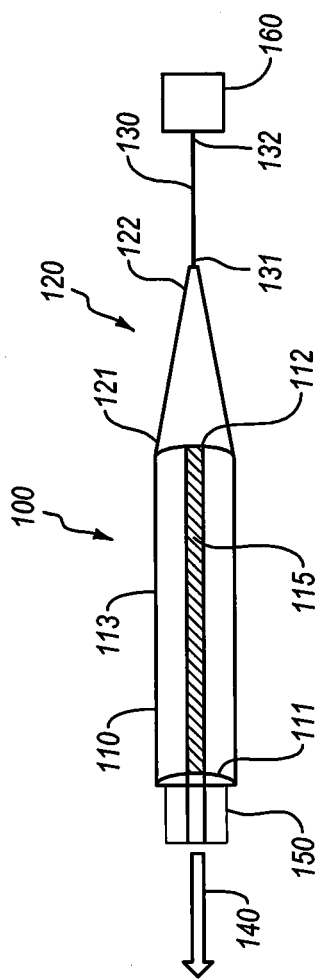
FIG. 1 illustrates an embodiment of an all fiber passively Q-switched laser.

Embodiments disclosed herein relate to an all fiber passively Q-switched laser, laser system, and methods of generating a laser light using the all fiber passively Q-switched laser and laser system.

Embodiments of an all Fiber Passively Q-Switched Laser and Laser System

Attention is now given to FIG. 1, which illustrates an all fiber passively Q-switched laser 100 (referred to hereinafter as laser 100) according to an embodiment disclosed herein. As illustrated, the laser 100 includes a large core doped gain fiber 110 that possibly supports multiple modes of laser light energy. The large core doped gain fiber 110 includes a first end 111 and a second end 112. The first end 111 may provide or have a laser output 140 pass through it. The laser output 140 may also pass through a first reflector 150 as will be described in more detail to follow. The laser output 140 is a high energy, short laser beam pulse as will also be described in more detail to follow.

The large core doped gain fiber 110 also includes a cladding 113 and a core 115. The cladding 113 and the core 115 may be constructed of any reasonable material and by any reasonable means. In some embodiments, the diameter of the core 115 may be larger than the core diameters of multimode fibers used in conventional Q-switched lasers. Advantageously, the use of a larger core diameter allows for greater energy in the large core doped gain fiber 110 as will be described in more detail to follow. In one embodiment, the diameter of the core 115 is about 15 to 50 microns (μm), preferably 30 microns, for an easier manufacturing for a mode transformer. It will be appreciated that the diameter of the core 115 may be more or less than 50 microns as circumstances warrant.

In some embodiments, the large core doped gain fiber 110 is doped to help increase the gain properties of the fiber. In one embodiment, the large core doped gain fiber 110 is doped with Ytterbium (Yb). In other embodiments, the large core doped gain fiber 110 is doped with Erbium (Eb). It will be appreciated that the large core doped gain fiber 110 may also be doped with other dopants as circumstances warrant. Accordingly, the embodiments disclosed herein are not limited to any particular typed of doped fiber.

As further illustrated in FIG. 1, the laser 100 also includes a mode transformer 120. The mode transformer 120 includes a first end 121 and a second end 122. The first end 121 may be fusion spliced to the second end 112 of the large core doped gain fiber 110. The mode transformer 120 may be the same material as the large core doped gain fiber 110. In some embodiments, the mode transformer 120 may be a tapered optical fiber, one end of which has the same structure as the large core doped gain fiber 110. In some embodiments, the mode transformer 120 may be either doped or non-doped.

The mode transformer 120 may be an adiabatically tapered shape that transitions the core diameter of the mode transformer 120 from a first core diameter size to a second core diameter size that is smaller than the first core diameter size. For example, the core diameter of the mode transformer 120 may have a core diameter size at the first end 121 that is same, or close to the same, as the core diameter 115 of the large core doped gain fiber 110. The mode transformer 120 may then transition from this core diameter size to the second core diameter size at the second end 122. The size of the core diameter of the mode transformer 120 at the second end 122 will typically equal, or be close to equaling, the core diameter size of a doped single mode fiber 130 that is coupled to the second 122 as will be explained in more detail to follow. In one embodiment, the core diameter of the mode transformer 120 may transition from about 20 microns to about 5 or 6 microns. As will be discussed in more detail to follow, because of the adiabatically tapered shape, the mode transformer 120 operates as an optical filter that filters out higher modes of light energy from a laser beam provided from the large core doped gain fiber 110 to the mode transformer 120.

Returning to FIG. 1, the laser 100 also includes the doped single mode fiber 130. The doped single mode fiber 130 includes a first end 131 and a second end 132. The first end 131 may be fusion spliced to the second end 122 of the mode transformer 120. As previously described, the core diameter of the doped single mode fiber 130 may be the same, or close to the same, as the core diameter of the mode transformer 120 at the second end 122. As will be described in more detail, in operation the doped single mode fiber 130 acts as a saturable absorber fiber for the laser 100. In addition, since the doped single mode fiber 130 only supports a single transverse mode, the combined action of the mode transformer 120 and the doped single mode fiber 130 helps the laser 100 to produce a good beam quality as the laser output 140. The laser output 140 is close to an ideal Gaussian beam in some embodiments.

The laser cavity of the laser 100 is formed between the first reflector 150 and a second reflector 160. As illustrated, the first reflector 150 is located adjacent to or coupled to the first end 111 of the large core doped gain fiber 110. Accordingly, the laser output 140 goes through the first reflector 150. In one embodiment, the first reflector 150 may be an output coupling fiber Bragg grating (FBG) at a desired output wavelength, for example 1030 nanometers. In an embodiment to be discussed further, the output coupling FBG may be included in a pump coupling bundled fiber. In another embodiment, the first reflector 150 may comprise the Fresnel reflection formed by causing the end 111 to be a flat, cleaved end. In one embodiment, the first reflector 150 exhibits 4% Fresnel reflection. It will be appreciated that first reflector 150 may be implemented in other ways than those described herein and that the embodiments disclosed herein are not limited to the type of first reflector 150.

The second reflector 160 is located adjacent to or coupled to the second end 132 of the doped single mode fiber 130. In some embodiments, the second reflector 160 may be a highly reflective FBG at a desired output wavelength, for example 1030 nanometers. It will be appreciated that the second reflector 160 may be implemented in other ways than those described herein and that the embodiments disclosed herein are not limited to the type of second reflector 160.

Figure 2:
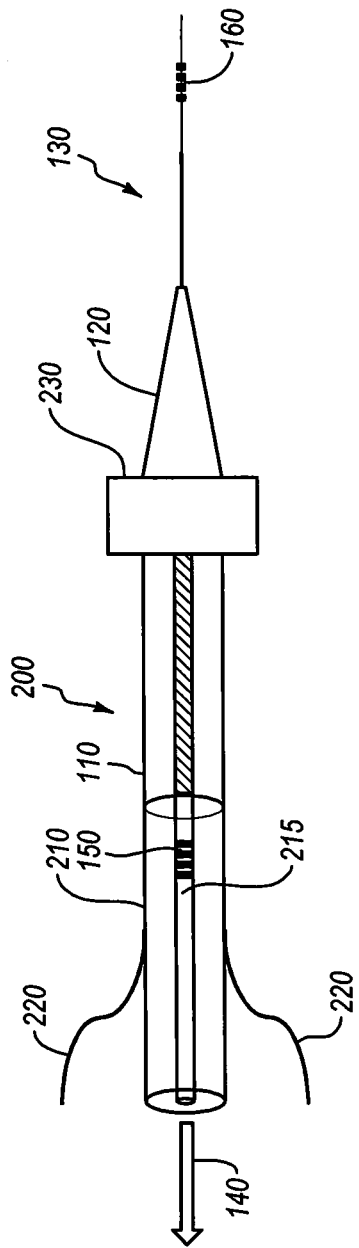
FIG. 2 illustrates an embodiment of an all fiber passively Q-switched laser system.

Attention is now given to FIG. 2, which illustrates an embodiment of a laser system 200 that implements the laser 100. As illustrated in FIG. 2, the elements of the laser 100 are the same as those explained in relation to FIG. 1 and thus will not be explained in detail in relation to FIG. 2. In the illustrated embodiment, the laser system 200 includes a pump coupling bundled fiber 210. The pump coupling bundled fiber 210 includes a core 215. In some embodiments, the core 215 may have the same diameter as the core 115 of the large core doped gain fiber 110. It will be appreciated, however, that the core 215 may be different from the core 115 as circumstances warrant. In the illustrated embodiment, the core 215 comprises the first reflector 150, which is an output coupling FBG, through which the laser output 140 passes.

A laser pump 220 is coupled to the laser 100, specifically to the large core doped gain fiber 110, though the pump coupling bundled fiber 210. In this way, the laser pump 220 is operable to provide pump energy to the large core doped gain fiber 110 to enhance the gain in the large core doped gain fiber 110. Although the pump 220 is illustrated as being coupled to the large core doped gain fiber 110 in a specific manner in FIG. 2, this is by way of illustration only. It will be appreciated that the pump 220 may be coupled to the large core doped gain fiber 110 in any other reasonable manner as circumstances warrant. In addition, it will be appreciated that laser pump 220 may be any type of reasonable laser pump.

In some embodiments, the laser system 200 may also include a pump stripper 230, which may be any reasonable pump stripper. The pump stripper 230 may be positioned adjacent the second end 112 of the large core doped gain fiber 110 and the first end 121 of the mode transformer 120. In operation, the pump stripper 230 is configured to remove any unabsorbed pump energy provided by the laser pump 220 from the beam of light provided to mode transformer 120 from the large core doped gain fiber 110. In an embodiment, the doped single-mode fiber 130 may not support the light guidance in the cladding. The unabsorbed pump in the cladding of the large core doped gain fiber 110 is not coupled into the cladding of the doped single-mode fiber 130, which obsoletes the need for an extra pump stripper.

FIG. 2 further illustrates the second reflector 160. In the illustrated embodiment, the second reflector 160 is a passive fiber that includes a highly reflective FBG that is coupled to the second end 132 of the doped single mode fiber 130.

Figure 3:
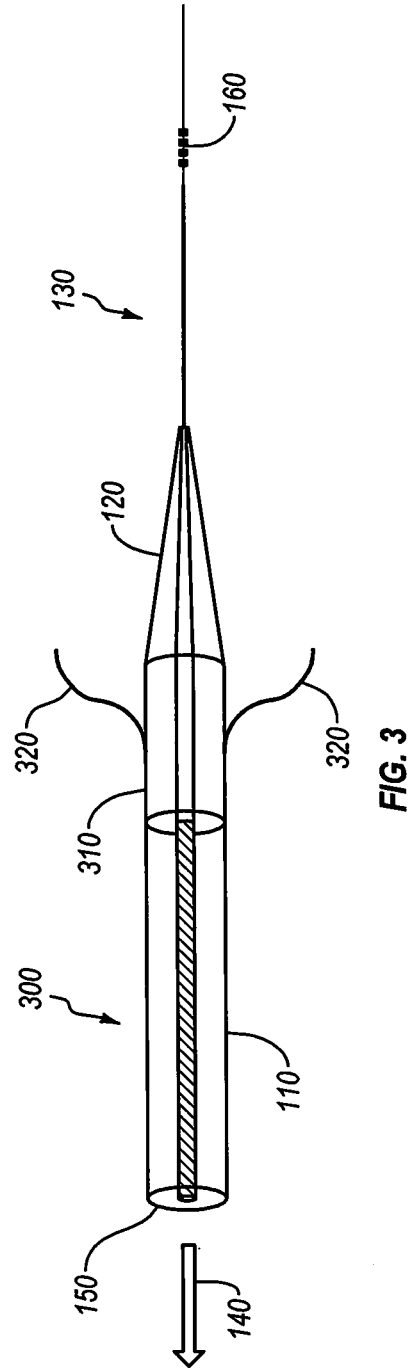
FIG. 3 illustrates an alternative embodiment of an all fiber passively Q-switched laser system.

Turning to FIG. 3, an alternative embodiment of a laser system 300 that implements the laser 100 is illustrated. As illustrated in FIG. 3, the elements of the laser 100 are the same as those explained in relation to FIG. 1 and thus will not be explained in detail in relation to FIG. 3. As illustrated, in the laser system 300 the first reflector 150 comprises a 4% Fresnel reflection created by the flat, cleaved end of the large core doped gain fiber 110. In addition, the laser output 140 passes through the first reflector 150.

In the embodiment of FIG. 3, the laser system 300 includes a pump coupler 310 and a laser pump 320. In the embodiment, the pump coupler 310 is positioned adjacent the second end 112 of the large core doped gain fiber 110 and the first end 121 of the optical mode coupler 120. The pump coupler 310 is configured to couple the laser pump 320 into the large core doped gain fiber 110. It will be appreciated that the pump coupler 310 may be positioned at other locations of the large core doped gain fiber 110.

The laser pump 320 is operable to provide pump energy to the large core doped gain fiber 110 to enhance the gain in the large core doped gain fiber 110. Although the pump 320 is illustrated as being coupled to the large core doped gain fiber 110 in a specific manner in FIG. 3, this is by way of illustration only. It will be appreciated that the pump 320 may be coupled to the large core doped gain fiber 110 in any other reasonable manner as circumstances warrant. In addition, it will be appreciated that laser pump 320 may be any type of reasonable laser pump.

Operation of an all Fiber Passively Q-Switched Laser and Laser System

Having described the structure of various embodiments of an all fiber passively Q-switched laser, the operation of the laser 100 will now be explained. In operation, a laser pump such as laser pump 220 or 320 provides pump energy to the large core doped gain fiber 110. The addition of the pump energy causes ion excitation in the large core doped gain fiber 110. Since the laser 100 is operated at a longer wavelength (for example, 1030 nanometers), a large number of excited ions are not required and a cladding pumping scheme may be implemented for a larger output power. Further, since the core diameter of the large core doped gain fiber 110 is about 30 microns in some embodiments, which is larger than conventional Q-switched lasers, greater output energy may be achieved.

As the number of excited ions increases, amplified spontaneous emission (ASE) of light increases in the large core doped gain fiber 110. This ASE produces a light energy possibly in a multiple transversal modes, that is provided to the doped single mode fiber 130 (i.e., the saturable absorber). However, prior to reaching the single mode fiber 130, the multimode beam passes through the mode transformer 120. As described, the mode transformer 120, due to its adiabatically tapered shape, automatically filters out undesirable higher-order modes from the beam of light, leaving only the fundamental Gaussian-like mode. Accordingly only the desired mode that is supported by the doped single mode fiber 130 reaches the doped single mode fiber 130.

This mode size reduction leads to a highly intense beam of light into the doped singlemode fiber 130 and helps the doped singlemode fiber 130 to quickly switch from absorbing to being transparent, thus producing a short pulse, high energy light beam as the laser output 140 as will be explained. As one of skill in the art will appreciate after reading this specification, providing for enhanced beam quality when implementing a large core medium for a large output energy is an advantageous advancement over conventional Q-switched lasers. That is, as the size of the gain medium increases, a higher power laser beam is achievable. However, the increased core size typically causes beam quality degradation through exciting multiple transversal modes. Thus, implementing the mode transformer 120 as described allows for the advantages of a large gain medium (i.e., the large core diameter size of core 115 of large core doped gain fiber 110) for higher power while being able to produce a high quality laser beam.

As mentioned, the ASE beam of light is provided to the doped single mode fiber 130. However, initially the doped single mode fiber 130 is extremely lossy and the excited population of the doped single mode fiber 130 remains near zero due to insufficient power in the arriving ASE light beam. However, after a certain time period the doped single mode fiber 130 reaches a critical ASE saturation threshold where the doped single mode fiber 130 becomes saturated and the doped single mode fiber 130 transmits the ASE with a negligible loss. Due to the reduced mode size in the doped single-mode fiber 130, compared to the large core gain fiber 110, which is provided by the mode transformer 120 previously discussed, the saturation of the doped single-mode fiber 130 occurs almost instantaneously (i.e., the laser switches quickly), while the large core gain fiber 110 is not saturated yet for the same ASE power.

The saturation of the doped single mode fiber 130 is explained as follows. The small core diameter of the doped single mode fiber 130 fiber increases the light intensity of the ASE greatly, which excites fully the population in the doped single mode fiber 130 and causes the fiber 130 to bleach. In the mean time, the large core doped gain fiber 110 is still not saturated by the generated ASE due to the large size of core 115. Hence, at this moment of bleaching the doped single mode fiber 130, the large core doped gain fiber 110 provides a very large gain (i.e., small-signal unsaturated gain), which quickly builds up the signal light beam. Now since the doped single mode fiber 130 does not absorb any light, the generated signal light will see the other end of the cavity (99% reflectivity from the second reflector 160 being implemented as a highly reflective FBG), which will bounce back the signal into the large core doped gain fiber 110. Double-passing the large core doped gain fiber 110 provides a sufficient gain to build up a large pulse, which sweeps out the majority of the accumulated energy in the inverted ions of the large core doped gain fiber 110 instantaneously. After this moment, the inversion of the large core doped gain fiber 110 greatly reduces to just above the "transparent" level. Still the pump photon excites the large core doped gain fiber 110 and the inversion accumulates further. Due to the reflected signal from the first reflector 150, there is a signal light in the cavity which keeps accumulating the gain from the inverted population. As soon as the ringing cavity signal accumulates enough power to saturate the large core doped gain fiber 110, further output pulses may occur. This explains the relaxation oscillation, which leads to the steady-state continuous-wave operation.

Said another way, once the saturation threshold is reached, the doped single mode fiber 130 quickly bleaches since the diameter of the doped single mode fiber 130 is much smaller than the diameter 115 of the large core doped gain fiber 110. As discussed above, in some embodiments, the diameter 115 is 30 microns and the diameter of the doped single mode fiber 130 is 5 or 6 diameters. This difference in diameters is equivalent to scaling the absorption cross-section of the doped single mode fiber 130. Thus, a large diameter ratio between the large core doped gain fiber 110 and the doped single mode fiber 130 leads to quicker bleaching of the doped single mode fiber 130, which in turn results in a shorter pulse for the laser output 140.

In some embodiments, it may take some time for the doped single mode fiber 130 to return to an absorbing state once the fiber has bleached. The amount of time may be determined by the upper state lifetimes of the ions that are used to dope the single mode fiber 130. As will be appreciated, the longer it takes for the single mode fiber 130 to return to the absorbing state, the longer it will be before additional desired pulses can be generated by the laser 100.

Figure 4:
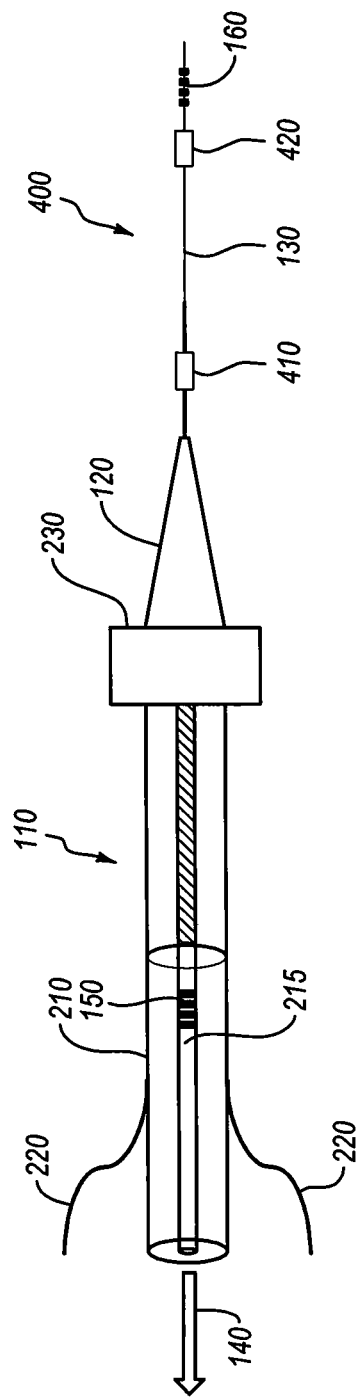
FIG. 4 illustrates an alternative embodiment of an all fiber passively Q-switched laser system including a second laser cavity.

Accordingly, in some embodiments, the laser 100 may include a second laser cavity 400 as illustrated in FIG. 4. As illustrated, the second cavity 400 is located between a third reflector 410 positioned at the first side 131 side of the doped single mode fiber 130 and a fourth reflector 420 positioned at the second side 132 side of the doped single mode fiber 130. However, the reflector 410 should not be seen by the laser cavity 100, which is comprised of the reflectors 150 and 160. That is, the large core gain fiber should not be able to see the reflector 410 directly. Otherwise, a new laser cavity, comprised of a broadband reflector 150 and the reflector 410 may cause a premature lasing action at undesired longer wavelength, defined by the reflector 410. In some embodiments, the third and fourth reflectors 410 and 420 may be separated from the laser cavity 100 through wavelength division multiplexers (WDM). In other embodiments, the third and fourth reflectors 410 and 420 may be highly reflective FBGs. In some embodiments the third and fourth reflectors 410 and 420 may be may be any combination of WDM and FBG. Because the operating wavelengths of the laser cavity 100 and the laser cavity 400 are distinct, the WDMs separate the laser cavities. As a result, any light at the wavelength for the laser cavity 400 is confined only in the doped single-mode fiber 130, through the separating action of the WDMs, which is completely separated from the large core gain fiber 110.

In one embodiment, the second laser cavity 400 is configured to resonate at 1100 nanometers. In operation, the second laser cavity 400 causes any residual excited ions in the single mode fiber 130 that are left after the bleaching process to trigger a laser in the second cavity 400. This is turn causes the majority of the ions to quickly relax to ground state where absorption may once again begin to occur, thus speeding up time that further energy pulses may be generated.

Said another way, the additional cavity 400 has a lower laser threshold for the inverted population since the wavelength for the cavity 400 is longer than the wavelength of the laser cavity 100. Once the doped single-mode fiber 130 becomes transparent for the wavelength of the laser cavity 100, the doped single-mode fiber 130 now has a positive gain for the wavelength of the cavity 400. After a short period since a giant laser pulse is produced in the laser cavity 100 with a shorter output wavelength, the laser cavity 400 now builds up the laser signal at a longer wavelength. Once a laser in a longer wavelength in the laser cavity 400 is built, the laser action quickly relaxes the excited ions of the doped single-mode fiber 130 since the transparent inversion level of a longer wavelength for the laser cavity 400 is substantially lower than the transparent inversion level of the short wavelength for the laser cavity 100.

Aspects of an all Fiber Passively Q-Switched Laser

Aspects of a simulation of all fiber passively Q-switched laser 100 will now be described. In one embodiment of a simulation, an Yb$^{3+}$ ion concentration of $7.89 \times 10^{19}$ ions/cm$^3$ is selected as a dopant for large core doped gain fiber 110 and doped single mode fiber 130. In addition, a pump power of 200 W at 976 nm is provided by the laser pump 220 or 320.

In the embodiment, large core doped gain fiber 110 is implemented as a 55 cm long gain fiber with 20 µm core diameter 115 and 125 µm cladding diameter 113. The doped single mode fiber 130 is implemented as a 66 cm long fiber with a 5 µm core diameter, with the same dopant and the same dopant concentration as the large core doped gain fiber. The transmittance of the mode transformer 120 is implemented at 90%. The second reflector 160 positioned at the second end 132 of the doped single mode fiber 130 and implemented as a 1030 nm FBG had 99.9% reflectivity. The pump 220 or 230 is run every 5 µs at a repetition rate of 200 kHz.

Figure 5:
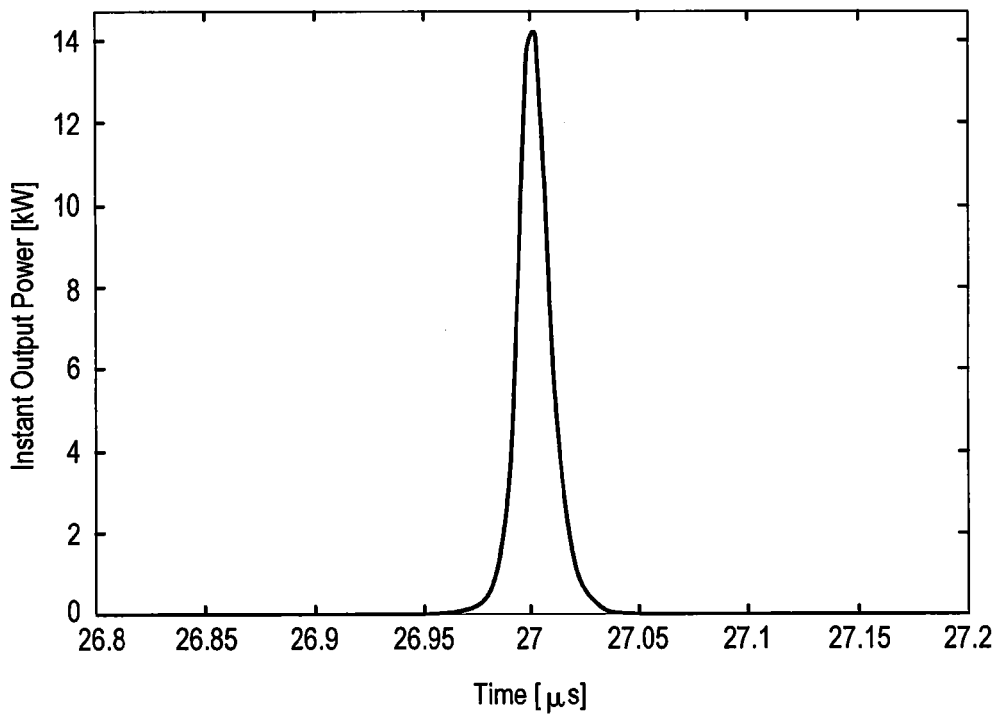
FIG. 5 illustrates output characteristics of an embodiment of an all fiber passively Q-switched laser.

FIG. 5 shows the output pulse produced by this embodiment of laser 100. As illustrated, the simulation produced an output pulse with 270 µJ energy and 15 ns pulse duration (FWHM) at 1030 nm.

In another embodiment of a simulation, the core area ratio between the large core doped gain fiber 110 and the doped single mode fiber 130 is varied during operation. In the embodiment, core diameter 115 of the large core doped gain fiber 110 is changed from 6 µm to 24 µm while scaling the cladding diameter 113 to ensure nominally the same amount of pump absorption. The core diameter of doped single mode fiber 130 is fixed at 5.75 µm. The repetition rate is fixed to 200 kHz.

Figure 6:
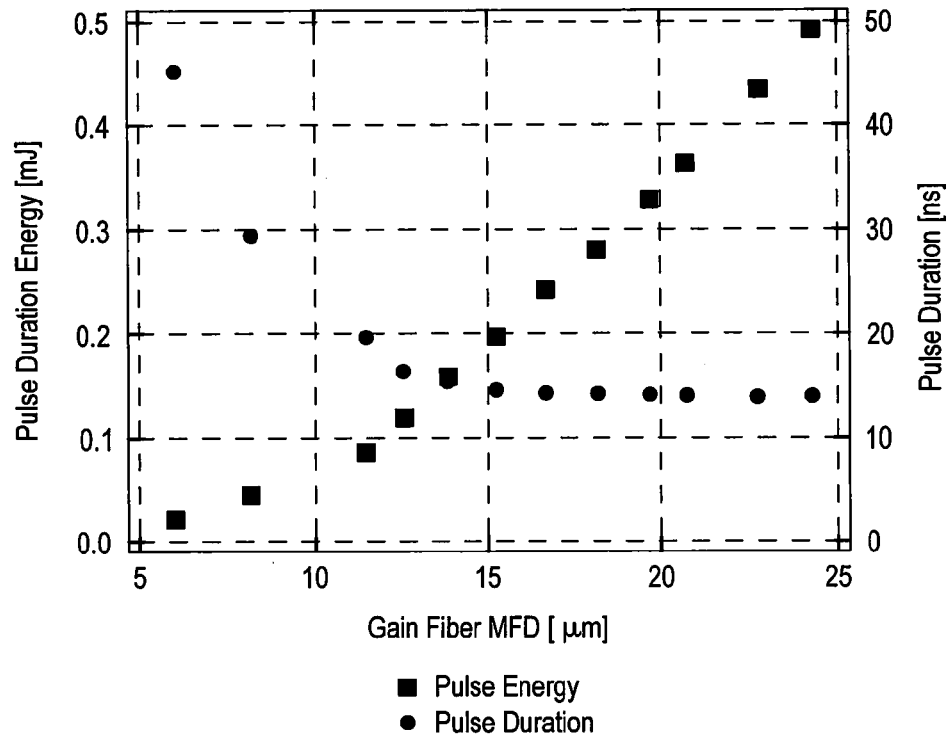
FIG. 6 illustrates the pulse energy and duration as a function of the size of the core diameter of the large core doped gain fiber of an embodiment of an all fiber passively Q-switched laser.

FIG. 6 illustrates the pulse energy and duration as a function of the size of the core diameter 115 of the large core doped gain fiber 110. When the core diameter 115 is small, a long pulse with low energy, similar to the natural relaxation oscillation, occurs since the gain saturates simultaneously with the doped single mode fiber 130. When the core diameter 115 is large, the pulse tends to have a larger energy and a short pulse duration. When the mode diameter of 115 is over 15 µm, where the doped singe mode fiber 130 bleaches instantly, the pulse duration remains essentially the same, owing to the same critical ASE power with a similar gain for fixed single mode fiber 130 parameters.

Example Methods

Figure 7:
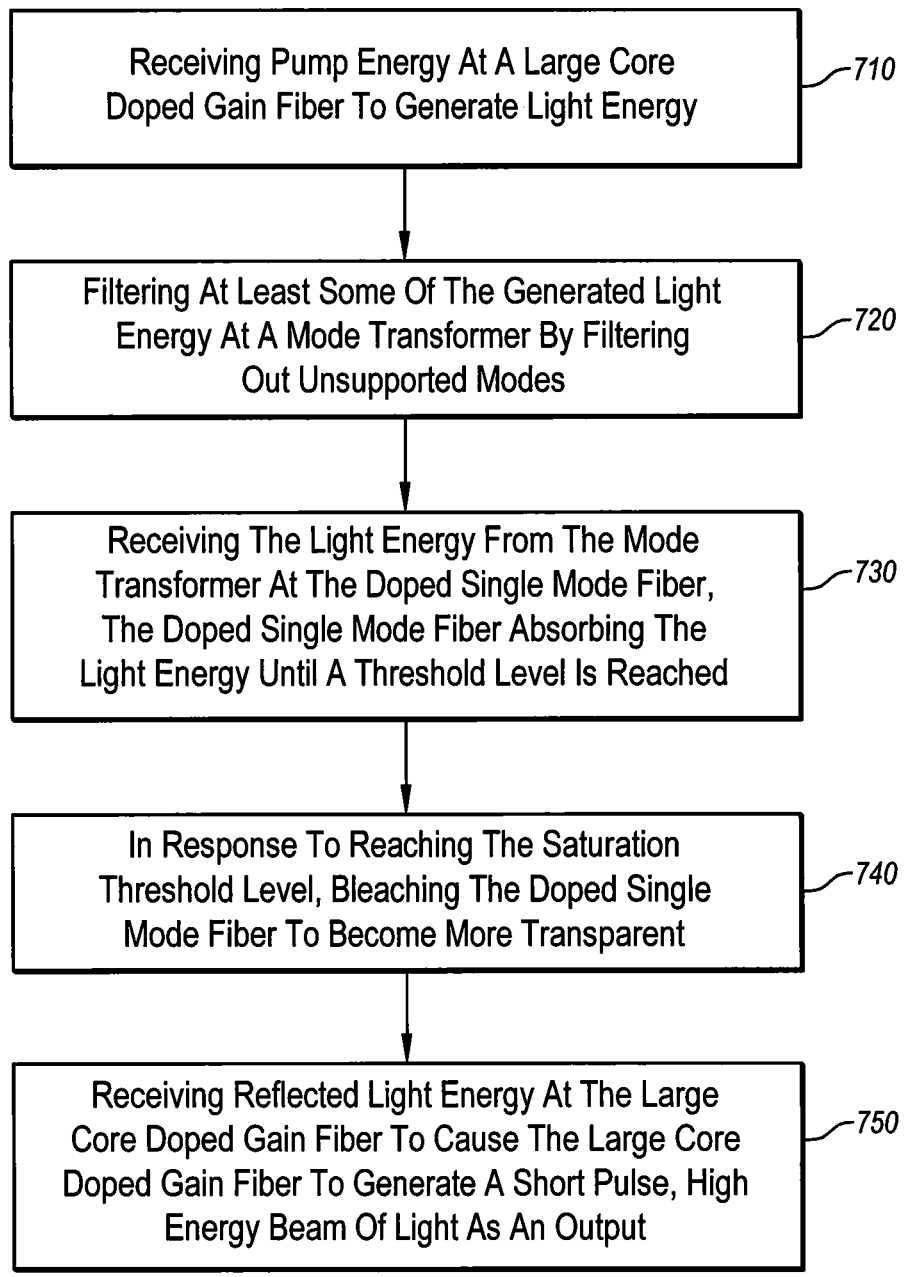
FIG. 7 illustrates a flow chart of an embodiment of a method for generating laser light using an all fiber passively Q-switched laser.

FIG. 7 is a flow diagram of an illustrative embodiment of a method 700 for generating laser light using an all fiber passively Q-switched laser. In the illustrated embodiment, the method 700, and other methods and processes described herein, set forth various functional blocks or actions that may be described as processing steps, functional operations, events and/or acts, etc., which may be performed by the laser 100 and/or the laser systems 200 and 300. The method 700 includes one or more operations as illustrated by acts The method 700 includes an act 710 of receiving pump energy at a large core doped gain fiber of the all fiber passively Q-switched laser, the pump energy exciting ions in the large core doped gain fiber such that light energy possibly having a plurality of light modes is generated. For example, as previously described the large core doped gain fiber 110 may receive pump energy from the laser pumps 220 or 230. The received pump energy causes a population inversion by exciting the ions in the core 115 (and possibly other areas) of the large core doped gain fiber 110. The excited ions may then begin to exhibit an ASE to generate the light energy potentially having several transverse modes.

The method 700 includes an act 720 of filtering at least some of the generated light energy at an mode transformer, the mode transformer having a core diameter that transitions from a core diameter of the large core doped gain fiber to a core diameter of a doped single mode fiber of the all fiber passively Q-switched laser, the transition causing the mode transformer to filter out light modes not supported by the single mode fiber. For example, as previously discussed the mode transformer 120 is adiabatically tapered such that the mode transformer transitions from the size of the core diameter 115 to the size of the core diameter of the single mode fiber 130. In some embodiments, this may include transitioning from about 30 microns to about 5 or 6 microns.

Because the mode transformer 120 is adiabatically tapered as described, the mode transformer automatically filters the light energy received from the large core doped gain fiber 110. That is, the mode transformer 120 removes those light modes that are not supported by the doped single mode fiber 130. As described, this helps to ensure enhanced beam quality at the laser 100 output.

The method 700 includes an act 730 of receiving the light energy from the mode transformer at the doped single mode fiber, the doped single mode fiber absorbing the light energy until a threshold level is reached. For example, as previously discussed the doped single mode fiber 130 received the light energy from the mode transformer 120. The doped single mode fiber 130 suppresses the light transmission until a threshold level is reached.

The method 700 includes an act 740 of in response to reaching the threshold level, bleaching the doped single mode fiber to become transparent. For example, as previously described once the doped single mode fiber 130 reaches the threshold level, the doped single mode fiber 130 quickly switches from absorbing to saturation, at which point the excitation of the ions in the doped single mode fiber 130 becomes transparent.

The method 700 includes an act 750 of receiving the reflected light energy from the reflector at the end of the doped single-mode fiber at the large core doped gain fiber to cause the large core doped gain fiber to generate a short pulse, high energy beam of light at an output of the all fiber passively Q-switched laser. For example, as previously described the reflected light energy by the reflector 160 is received by the large core doped gain fiber 110. The reflected light causes the already excited ions in the large core doped gain fiber 110 to generate the short pulse, high energy beam of light as the laser output 140. In some embodiments, the short pulse, high energy beam of light at the output has a 14 or 15 nanosecond pulse duration and a 270 µJ pulse energy.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An all fiber passively Q-switched laser comprising:
   a large core doped gain fiber having a first end and a second end opposite the first end, the large core doped gain fiber having a first core diameter;
   a doped single mode fiber having a second core diameter that is smaller than the first core diameter, the doped single mode doped fiber configured as a saturable absorber and having a first end and a second end opposite the first end;
   a mode transformer directly coupled to the second end of the large core doped gain fiber and to the first end of the doped single mode fiber, the mode transformer having a core diameter that transitions from the first core diameter to the second core diameter such that the mode transformer is configured to filter out light modes not supported by the doped single mode fiber; and
   a single laser cavity formed between a first reflector positioned adjacent to the large core doped gain fiber and a second reflector positioned adjacent to the doped single mode fiber, wherein an output light beam of the all fiber passively Q-switched laser passes through the first reflector.

2. The all fiber passively Q-switched laser in accordance with claim 1, further comprising:
   a laser pump coupled to the first end of the large core doped gain fiber, the laser pump configured to provide pumped energy to the large core doped gain fiber.

3. The all fiber passively Q-switched laser in accordance with claim 2, wherein the laser pump cladding pumps the large core doped gain fiber.

4. The all fiber passively Q-switched laser in accordance with claim 1, further comprising:
   a pump stripper positioned adjacent the second end of the large core doped gain fiber and the mode transformer, the pump stripper configured to remove any unabsorbed pump energy provided by a laser pump from a beam of light provided to the mode transformer.

5. The all fiber passively Q-switched laser in accordance with claim 1, wherein the large core doped gain fiber and the doped single mode fiber comprise the same material and are Ytterbium (Yb) doped fibers.

6. The all fiber passively Q-switched laser in accordance with claim 1, wherein the first reflector is an output coupling fiber Bragg grating (FBG) reflector at 1030 nanometers and the second reflector is a highly reflective FBG at 1030 nanometers.

7. The all fiber passively Q-switched laser in accordance with claim 1, wherein the first reflector is a Fresnel reflection caused by a flat cleaved end of the large core doped gain fiber and the second reflector is a highly reflective FBG at 1030 nanometers.

8. The all fiber passively Q-switched laser in accordance with claim 1, wherein the first core diameter is about 30 microns and the second core diameter is about 5 or 6 microns.

9. The all fiber passively Q-switched laser in accordance with claim 8, wherein the mode transformer transitions from about 30 microns to about 5 or 6 microns.

10. The all fiber passively Q-switched laser in accordance with claim 1, further comprising:
    a second laser cavity formed between a third reflector positioned at the first end side of the doped single mode fiber and a fourth reflector positioned at the second end side single mode fiber.

11. The all fiber passively Q-switched laser in accordance with claim 10, wherein the third and fourth reflectors are highly reflective FBG at 1100 nanometers.

12. The all fiber passively Q-switched laser in accordance with claim 1, wherein the laser operates at 1030 nanometers with a 14 or 15 nanosecond pulse duration and a 270 µJ pulse energy.

13. An all fiber passively Q-switched laser system comprising:
    a large core doped gain fiber having a first end and a second end opposite the first end, the large core doped gain fiber having a first core diameter, wherein an output beam of light passes through the first end when being transmitted;
    a laser pump coupled to the large core doped gain fiber, the laser pump configured to provide pumped energy to the large core doped gain fiber;
    a saturable absorber having a second core diameter that is smaller than the first core diameter, the saturable absorber having a first end and a second end opposite the first end;
    a mode transformer positioned between the second end of the large core doped gain fiber and the first end of the saturable absorber, the mode transformer having a core diameter that transitions from the first core diameter to the second core diameter such that the mode transformer is configured to filter out light modes not supported by the saturable absorber; and
    a single and substantially linear laser cavity formed between a first reflector positioned adjacent the large core doped gain fiber and a second reflector positioned adjacent the saturable absorber, the laser cavity including the mode transformer.

14. The all fiber passively Q-switched laser system in accordance with claim 13, wherein the laser pump is coupled to a pump coupling bundled fiber that is positioned adjacent the large core doped gain fiber.

15. The all fiber passively Q-switched laser system in accordance with claim 14, wherein the first reflector is included in the pump coupling bundled fiber.

16. The all fiber passively Q-switched laser system in accordance with claim 13, wherein the laser pump is coupled to a pump coupler that is positioned adjacent the large core doped gain fiber and the mode transformer and wherein the first reflector is a Fresnel reflection caused by a flat cleaved end of the large core doped gain fiber.

17. The all fiber passively Q-switched laser system in accordance with claim 13, further comprising:
    a second laser cavity, which is completely separated from the first laser cavity through wavelength division multiplexers and is formed between a third reflector positioned at the first end side of the saturable absorber and a fourth reflector positioned at the second end side of the saturable absorber.

18. A method of generating laser light using an all fiber passively Q-switched laser, the method comprising:
    receiving pump energy at a large core doped gain fiber of the all fiber passively Q-switched laser, the pump energy exciting ions in the large core doped gain fiber such that light energy having a plurality of light modes is generated;
    filtering at least some of the generated light energy at a mode transformer directly coupled to the large core doped fiber, the mode transformer having a core diameter that transitions from a core diameter of the large core doped gain fiber to a core diameter of a doped single mode fiber of the all fiber passively Q-switched laser, the transition causing the mode transformer to filter out light modes not supported by the doped single mode fiber;

receiving the light energy from the mode transformer at the doped single mode fiber that is directly coupled to the mode transformer, the doped single mode fiber absorbing the light energy until a saturation threshold level is reached;

in response to reaching the saturation threshold level, bleaching the doped single mode fiber to become transparent;

receiving reflected light energy at the large core doped gain fiber after reflection thereof by a reflector adjacent to the doped single mode fiber and without passing any intervening reflectors between the reflector and the large core doped gain fiber, thereby generating a short pulse, high energy beam of light as an output of the all fiber passively Q-switched laser.

19. The method of claim 18, wherein the short pulse, high energy beam of light as the output has a 14 to 15 nanosecond pulse duration and a 270 µJ pulse energy.

20. The method of claim 18, wherein the mode transformer transitions from about 30 microns to about 5 to about 6 microns.

\* \* \* \* \*